No. 637,613. Patented Nov. 21, 1899.
P. HOWE.
CLOTH CUTTER.
(Application filed Aug. 29, 1895.)
(No Model.)
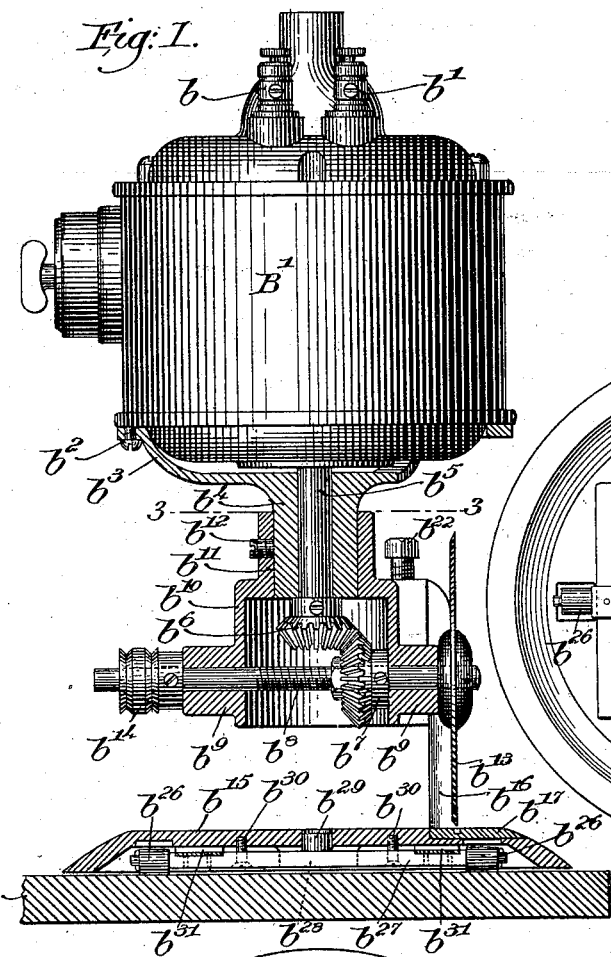
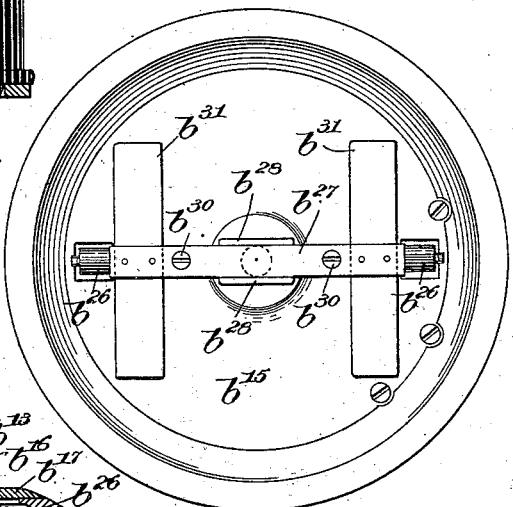
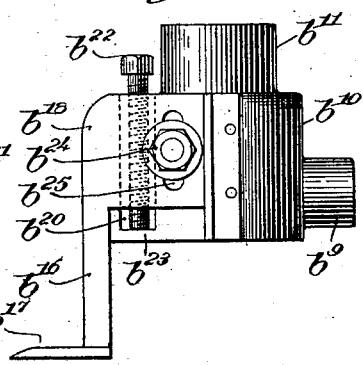
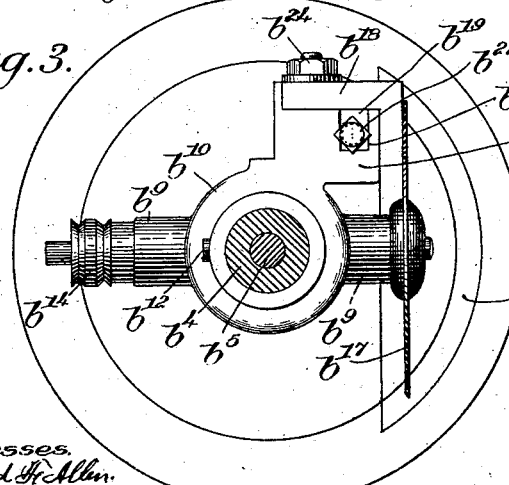
Witnesses.
Edward H. Allen.
L. M. Gowell
Inventor.
Patrick Howe,
by Crosby Gregory
attys.
THE NORRIS PETERS CO., PHOTO-LITHO., WASHINGTON, D. C.

UNITED STATES PATENT OFFICE.

PATRICK HOWE, OF BOSTON, MASSACHUSETTS, ASSIGNOR OF FIVE-SIXTHS TO THE FENNO CLOTH CUTTING MACHINE COMPANY, OF SAME PLACE.

CLOTH-CUTTER.

SPECIFICATION forming part of Letters Patent No. 637,613, dated November 21, 1899.

Application filed August 29, 1898. Serial No. 689,722. (No model.)

*To all whom it may concern:*

Be it known that I, PATRICK HOWE, of Boston, county of Suffolk, State of Massachusetts, have invented an Improvement in Cloth-Cutters, of which the following description, in connection with the accompanying drawings, is a specification, like letters on the drawings representing like parts.

My invention is an improvement in electric cloth-cutters, being intended for the use of tailoring establishments where it is customary to cut simultaneously a considerable thickness of superimposed pieces of cloth.

My improved cutter enables me to cut intricate patterns with ease and to cut an unusual thickness of cloth with a minimum of power, my invention also containing various improvements whereby the life of the machine is prolonged and the freedom of movement thereof increased, all as will be more fully pointed out in the course of the following detailed description thereof, and more particularly defined in the appended claims, forming a part of this specification.

Figure 1 is a view, largely in central vertical section, showing my improved cutter in place on the table. Fig. 2 is a bottom plan view thereof. Fig. 3 is a horizontal section taken on the line 3 3, Fig. 1. Fig. 4 is a detail in side elevation showing the adjusting mechanism thereof.

My improved electric cloth-cutter B is provided with a motor B', which may be connected with any suitable source of electric energy by means of feed-wires (not shown) connected to the binding-posts $b$ $b'$. This motor may be of any usual or preferred winding and internal construction, and inasmuch as it does not of itself constitute a novel feature of my invention I omit further description of its details.

On the lower end of the motor armor or casing is fastened by screws $b^2$ a spider or bracket $b^3$, whose extended hub $b^4$ constitutes a bearing for the armature-shaft $b^5$ of the motor. Said shaft carries at its lower end a miter-gear $b^6$, meshing with a similar gear $b^7$, adjustably secured on a transverse shaft $b^8$, mounted adjacent to its opposite ends in bearings $b^9$ of a hanger $b^{10}$, recessed at $b^{11}$ to receive the hub $b^4$, adjustably secured therein by suitable means, as by a set-screw $b^{12}$. At its extreme right end, as shown in Fig. 1, the shaft $b^8$ carries a usual or other disk cutter $b^{13}$, while the opposite end of the shaft is preferably provided with pulleys $b^{14}$ for driving an automatic sharpening device, which does not constitute any part of my present invention and therefore is not herein shown.

The mechanism of the motor thus far described is adjustably supported on a base $b^{15}$ by means of a leg $b^{16}$, whose foot $b^{17}$ is secured adjacent to one edge of the circular base $b^{15}$, as is clearly shown in Fig. 3. The leg $b^{16}$ has at its upper end an L or right-angle flange $b^{18}$, which is provided on its inner face with a rib $b^{19}$, fitting a slot $b^{20}$ in an offset or arm $b^{21}$ of the hanger $b^{10}$. The rib $b^{19}$ is threaded to receive an adjusting-bolt $b^{22}$, which bears against the closed lower end $b^{23}$ of said slot $b^{20}$, and the L $b^{18}$ is held against the arm $b^{21}$ by a nut and bolt $b^{24}$, working in a slot $b^{25}$ in the L, as is clearly shown in Figs. 3 and 4. Thus it will be evident that by reason of the adjustment last described the hanger $b^{10}$ and its knife or cutter disk can be adjusted to and from the base $b^{15}$ to accommodate a large or small cutter, as the case may be, and to keep the parts in proper adjustment as the cutter wears through use, while, likewise, by reason of the adjustability of the hanger relatively to the motor, all wear between the intermediate gearing may be compensated for, and, furthermore, the separable character of the spider and bearing $b^4$ makes it a very easy matter when said bearing has worn to simply remove the spider and substitute a new one without otherwise changing the mechanism or requiring the purchase of a new machine.

Referring to Fig. 2, which shows a bottom plan view of the base shown in section in Fig. 1, it will be seen that I provide rolls $b^{26}$, journaled on a bar $b^{27}$, held against swinging movement between retaining-guides $b^{28}$, and against longitudinal movement preferably by a central stud $b^{29}$ and headed studs $b^{30}$, the former working freely in a recess in the base-plate and the latter in recesses in the bar $b^{27}$. Secured to the bar $b^{27}$ are balanced springs $b^{31}$, herein shown in the form of opposite leaf-springs, these springs being of sufficient strength to just about balance the weight of the superimposed mechanism and raise the base and its mechanism from the table, as shown in Fig. 3. I regard this feature of my invention as of considerable importance, inasmuch as it enables me to turn rapidly in any position, coöperating with the cutting-disk $b^{13}$, placed at one edge of the base. It enables me to cut short turns, such as arm-scyes, with much greater facility than has heretofore been possible with disk cutters. One advantage of this arrangement is that the cutter B can be turned at any time in any curve or angle required by an intricate pattern, and this is of special importance in such places as cutting the arm-scye, for it will be understood where a considerable thickness of cloth, amounting, it may be, to several inches, is being cut such turning presents more difficulties than it would were simply one thickness of cloth being cut. Coöperating further toward this end I have constructed the cutter so that the space below the shaft $b^8$ is left free to receive the thickness of cloth being cut, thereby permitting the employment of a relatively small cutter, which, it will be understood, permits of turning a shorter and sharper curve than if the cutter were larger.

Circular cutters have heretofore been provided fast directly on the armature-shaft of the motor, the motor in such case being horizontal instead of vertical, and said construction requires, as will be evident, that the cutting-disk shall be extremely large, inasmuch as only such a thickness of cloth can be cut as can pass beneath the motor itself. My construction, however, makes practically the entire cutter available for intricate cutting, inasmuch as the cloth can occupy all the space between the base $b^{15}$ and the hub of the cutter. Furthermore, by my construction the cutter can be put in place, the nut $b^{24}$ being loosened, and then simply by adjusting the bolt $b^{22}$ the cutter may be adjusted up or down to the precise extent necessary in order to secure the best results, and as the cutter wears it may be lowered, so as to maintain its maximum efficiency. Again, by providing the circular base, in combination with having the leg $b^{16}$ at one extreme edge thereof, the cutter can be run along the edge of the table and can be turned at any angle with the utmost freedom, whereas if the base were rectangular the corners thereof would restrict its freedom of movement in connection with having the cutting-disk on the extreme edge, and finally by providing the rolls $b^{26}$ on a bar arranged centrally of the base there is always a freedom of turning movement which cannot be obtained otherwise, inasmuch as all other constructions with which I am familiar have the rollers in such positions and so arranged that a rotary movement of the base causes one or more of the rollers to move endwise and dig into the table, whereas by my construction not only are the rollers in position always to facilitate turning movement, but they coöperate with each other in permitting the base to be tilted to one side or the other, as may be desired.

Further advantages and facilities of movement will be understood by those skilled in the art.

I do not intend to limit my invention to the mechanism herein particularly described, inasmuch as many changes and substitutions may be resorted to without departing from the spirit and scope of my invention.

Having described my invention, what I claim as new, and desire to secure by Letters Patent, is—

1. The herein-described cloth-cutter, comprising a motor, a spider removably secured to one end of the motor and having an extended central hub, the armature-shaft of said motor being journaled in said hub, a cutter-shaft and its cutter, gearing connecting said two shafts, said cutter-shaft being journaled in a hanger adjustably connected to said hub, substantially as described.

2. The herein-described cloth-cutter, comprising a base, a leg projecting therefrom, a hanger having a cutter-shaft and cutter journaled therein, means for driving said cutter, said hanger and said leg having interlocking portions movable on each other and including a slot with a closed end on one, and the other being provided with an adjusting-bolt engaging said closed end, whereby said leg and hanger may be adjusted for raising and lowering the cutter relatively to said base, substantially as described.

3. In a cloth-cutter, the combination with the base thereof, recessed on its under side, of a bar secured to the under side of said base and movable toward and from the same, means restraining said bar from endwise and swinging movement, means normally holding said bar yieldingly away from said base, and a plurality of rollers journaled on said bar for supporting the cloth-cutter, substantially as described.

4. In a cloth-cutter, the combination with the base thereof, recessed on its under side, of a pair of rollers, one on either side the center of said base and having their axes coincident with the diameter of the base, means maintaining said rollers in the same relative position to said center, and means normally holding said rollers yieldingly away from said base, substantially as described.

In testimony whereof I have signed my name to this specification in the presence of two subscribing witnesses.

PATRICK HOWE.

Witnesses:
GEO. H. MAXWELL,
FREDERICK L. EMERY.